(12) United States Patent
Kim et al.

(10) Patent No.: US 7,853,808 B2
(45) Date of Patent: *Dec. 14, 2010

(54) INDEPENDENT PROCESSOR VOLTAGE SUPPLY

(75) Inventors: Dae Ik Kim, Fishkill, NY (US); Jonghae Kim, Fishkill, NY (US); Moon J Kim, Wappingers Fall, NY (US); James R Moulic, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 793 days.

This patent is subject to a terminal disclaimer.

(21) Appl. No.: 11/624,333

(22) Filed: Jan. 18, 2007

(65) Prior Publication Data

US 2008/0178023 A1      Jul. 24, 2008

(51) Int. Cl.
*G06F 1/26* (2006.01)
(52) U.S. Cl. .................. 713/300; 713/310; 713/320; 713/321; 713/322; 713/323; 713/324; 713/330
(58) Field of Classification Search ............. 713/300, 713/310, 320–324, 330, 340
See application file for complete search history.

(56) References Cited

U.S. PATENT DOCUMENTS

| | | | |
|---|---|---|---|
| 6,772,356 | B1 | 8/2004 | Qureshi et al. |
| 6,922,783 | B2 | 7/2005 | Knee et al. |
| 7,016,249 | B2 | 3/2006 | Ross |
| 7,028,196 | B2 | 4/2006 | Soltis, Jr. et al. |
| 7,080,267 | B2 | 7/2006 | Gary et al. |
| 7,418,368 | B2 * | 8/2008 | Kim et al. .................. 702/185 |
| 7,667,487 | B2 * | 2/2010 | Bartley et al. ................ 326/38 |
| 2004/0076189 | A1 * | 4/2004 | Boerstler et al. .............. 370/516 |
| 2004/0215987 | A1 | 10/2004 | Farkas et al. |
| 2004/0268161 | A1 | 12/2004 | Ross |
| 2005/0034002 | A1 * | 2/2005 | Flautner ..................... 713/322 |

(Continued)

FOREIGN PATENT DOCUMENTS

EP    0978781 A2    2/2000

(Continued)

OTHER PUBLICATIONS

Tan P J et al: "Testing of UltraSPARC T1 Microprocessor and its Challenges", Test Confernece, 2006. ITC '06 IEEE International, IEEE, PI, Oct. 2006, pp. 1-10, XP031014707.

*Primary Examiner*—Abdelmoniem Elamin
(74) *Attorney, Agent, or Firm*—Patrick J. Daugherty; Driggs, Hogg, Daugherty & Del Zoppo Co., LPA (57) ABSTRACT

Systems, methods and program codes are provided for selectively adjusting multi-core processor chip structure individual processor core power supply voltages through controlling individual power supplies for each core, in one aspect to ensure that one or more cores operate at clock rates in compliance with one or more performance specifications. Nominal power supply voltage is supplied to a first processing core, and a second core power supply voltage greater or lower than the nominal power supply voltage is supplied to a second processing core, both cores operating in compliance with a reference clock rate specification. The second power supply voltage may be selected from ordered discrete supply voltages derived by progressively lowering the nominal supply voltage, optionally wherein the selected supply voltage also enables the second core to operate within another performance specification.

20 Claims, 4 Drawing Sheets

U.S. PATENT DOCUMENTS

| | | | |
|---|---|---|---|
| 2006/0171244 A1* | 8/2006 | Ando | 365/233 |
| 2006/0282692 A1* | 12/2006 | Oh | 713/300 |
| 2008/0005591 A1* | 1/2008 | Trautman et al. | 713/300 |
| 2008/0005592 A1* | 1/2008 | Allarey et al. | 713/300 |
| 2008/0104425 A1* | 5/2008 | Gunther et al. | 713/300 |
| 2008/0177506 A1* | 7/2008 | Kim et al. | 702/186 |
| 2008/0262777 A1* | 10/2008 | Kim et al. | 702/117 |
| 2009/0138737 A1* | 5/2009 | Kim et al. | 713/322 |

FOREIGN PATENT DOCUMENTS

| | | |
|---|---|---|
| EP | 1736851 A2 | 12/2006 |
| WO | 03014902 A1 | 2/2003 |
| WO | 2008022881 A1 | 2/2008 |

* cited by examiner

INDEPENDENT PROCESSOR VOLTAGE SUPPLY

FIELD OF THE INVENTION

The present invention relates to semiconductor devices, and methods and program products for manufacturing semiconductor devices, and more particularly to multiple-core processor structures.

BACKGROUND OF THE INVENTION

Multi-core microprocessor (MCP) chips comprise a plurality of independent digital signal processor (DSP) cores on one single integrated circuit (IC) chip package, and are useful and efficient structures for central processing unit (CPU) and System-on-a-chip or System on Chip (SoC or SOC) applications. The provision of pluralities of individual instruction processing cores enables higher computation capacity relative to single processor chip structures. Computer systems incorporating MCP's usually consume less power and have a lower cost and higher reliability than alternative multi-chip systems, as well as provide assembly cost advantages by requiring fewer physical system components.

As with single processor chip structures, MCP processors must meet performance specifications for a given operating environment input(s), wherein each core must generally demonstrate one or more specified clock rates in response to a common power supply voltage. However, particularly with respect to sub-100 nanometer semiconductor applications, individual MCP processing cores may have different performance characteristics due to with-in chip process variations.

Generally, the probability that an MCP will meet the performance specifications for a given specific operating environment diminishes in proportion to the number of individual processing cores on the MCP. This is due in part to the fact that while most of the individual cores may meet performance requirements, one or more individual cores may fail under the same operating environment. In some cases, failure of only one core may cause an entire MCP structure to fail specifications, even though most or all of the rest of the cores perform within specifications. Thus, the total costs involved in deploying an MCP chip may exceed those of alternative multi-chip solutions due to lower manufacturing yields.

SUMMARY OF THE INVENTION

According to the present invention, a method is provided comprising supplying power to processing cores formed on a multi-core processor system chip by supplying a nominal power supply voltage to a first processing core and a second core power supply voltage to a second processing core, the second core power supply voltage greater or lower than the nominal power supply voltage, and wherein the first and second cores thereby operate in compliance with a reference clock rate specification. In one aspect the second core power supply voltage is selected by raising or lowering a nominal power supply voltage until the second core meets the minimum reference clock rate specification.

In another aspect, a method selects a lower second core power supply by progressively lowering the nominal supply voltage to define a plurality of progressively ordered discrete supply voltages and selecting a lowest supply voltage of the plurality at which the second core operates in compliance with the reference clock rate specification. In one aspect, the reference clock rate specification is a sum of a specified reference clock rate and a margin rate. In another aspect, determining the second core supply voltage comprises adding a margin voltage to a selected lowest supply voltage of the plurality of ordered voltages. In another aspect, determining the second core supply voltage comprises selecting the lowest supply voltage of the plurality of ordered voltages that is also greater than a specified functional threshold voltage.

Still further, in one aspect the second core supply voltage is determined by selecting a lowest supply voltage of the plurality of ordered voltages that also enables the second core to operate within a performance specification when processing a functional test code. In one aspect, the functional test code is a core bottleneck behavior code or a worst-case delay code.

In another aspect, a method selects a lowest supply voltage by progressively testing the second core with a functional test code at each of a plurality of progressively ordered discrete supply voltages in an order from lowest voltage to highest voltage until one of the discrete supply voltages is identified at which the second core operates within a performance specification.

In another aspect, a method further comprises supplying a third core power supply voltage to a third processing core, the third core power supply voltage selected by raising the nominal power supply voltage until the third core meets the reference clock rate specification.

In another aspect, a multi-core processor chip system is provided comprising first and second individual processing cores formed on a unitary chip structure, each core connected to first and second adjustable power supplies, respectively. A controller connected to the first and second power supplies is configured to cause the first power supply to supply a nominal power supply voltage to the first core and cause the second power supply to supply a second power supply voltage to a second core, the second power supply voltage more or less than the nominal voltage, wherein the first and second cores operate within a reference clock rate specification.

In one aspect, a system controller is configured to select the second power supply voltage by raising or lowering a second power supply nominal power supply voltage until the second core meets the reference clock rate specification. In another aspect system first and second individual processing cores are formed in a common process. In another aspect, at least one inter-core voltage-level translation communication block is provided in communication with the cores and configured to the cores to function with divergent on-signal supply voltages.

In one aspect, a system controller is configured to determine the second core supply voltage by selecting a lowest supply voltage of a plurality of ordered discrete supply voltages that are also each greater than a specified functional threshold voltage. In another aspect, a system controller determines the second core supply voltage by selecting a lowest supply voltage of a plurality of ordered discrete supply voltages that also enables the second core to operate within a performance specification when processing a functional test code. In one aspect, the functional test code is a core bottleneck behavior code or a worst-case delay code. In another aspect, a system further comprises a third processing core supplied with a third core power supply voltage selected by raising the nominal power supply voltage until the third core meets the reference clock rate specification.

In another aspect, a method is provided for producing computer executable program code and providing the program code to be deployed to and executed on a computer system, for example by a service provider who offers to implement, deploy, and/or perform functions for others. Still further, an article of manufacture comprising a computer usable medium having the computer readable program embodied in said medium may be provided. The program code comprises instructions which, when executed on the computer system, cause the computer system to selectively adjust multi-core processor chip structure individual processor core power supply voltages to ensure that one or more cores operate at clock rates in compliance with one or more performance specifications.

In one aspect, a program code causes a computer system to supply power to first and second processing cores formed on a multi-core processor system chip by supplying a nominal power supply voltage to a first processing core and a second core power supply voltage to a second processing core, the second core power supply voltage greater or lower than the nominal power supply voltage, wherein the first and second cores operate in compliance with a reference clock rate specification.

In one aspect, a program code causes a computer system to select a second core power supply voltage by raising or lowering a nominal power supply voltage until the second core meets the reference clock rate specification. In another aspect, a program code causes a computer system to select a second core power supply voltage by progressively lowering a nominal supply voltage to define a plurality of progressively ordered discrete supply voltages; and determine the second core supply voltage by selecting a lowest supply voltage of the plurality of ordered discrete supply voltages at which the second core operates at a rate in compliance with a reference clock rate specification.

In another aspect, a program code causes a computer system to add a margin voltage to a selected lowest supply voltage of a plurality of ordered discrete supply voltages. And in another aspect, a program code causes a computer system to determine a second core supply voltage by selecting a lowest supply voltage of a plurality of ordered discrete supply voltages that also enables a second core to operate within a performance specification when processing a functional test code.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:

I. General Description

II. Computerized Implementation

I. General Description.

Figures 1, 2:
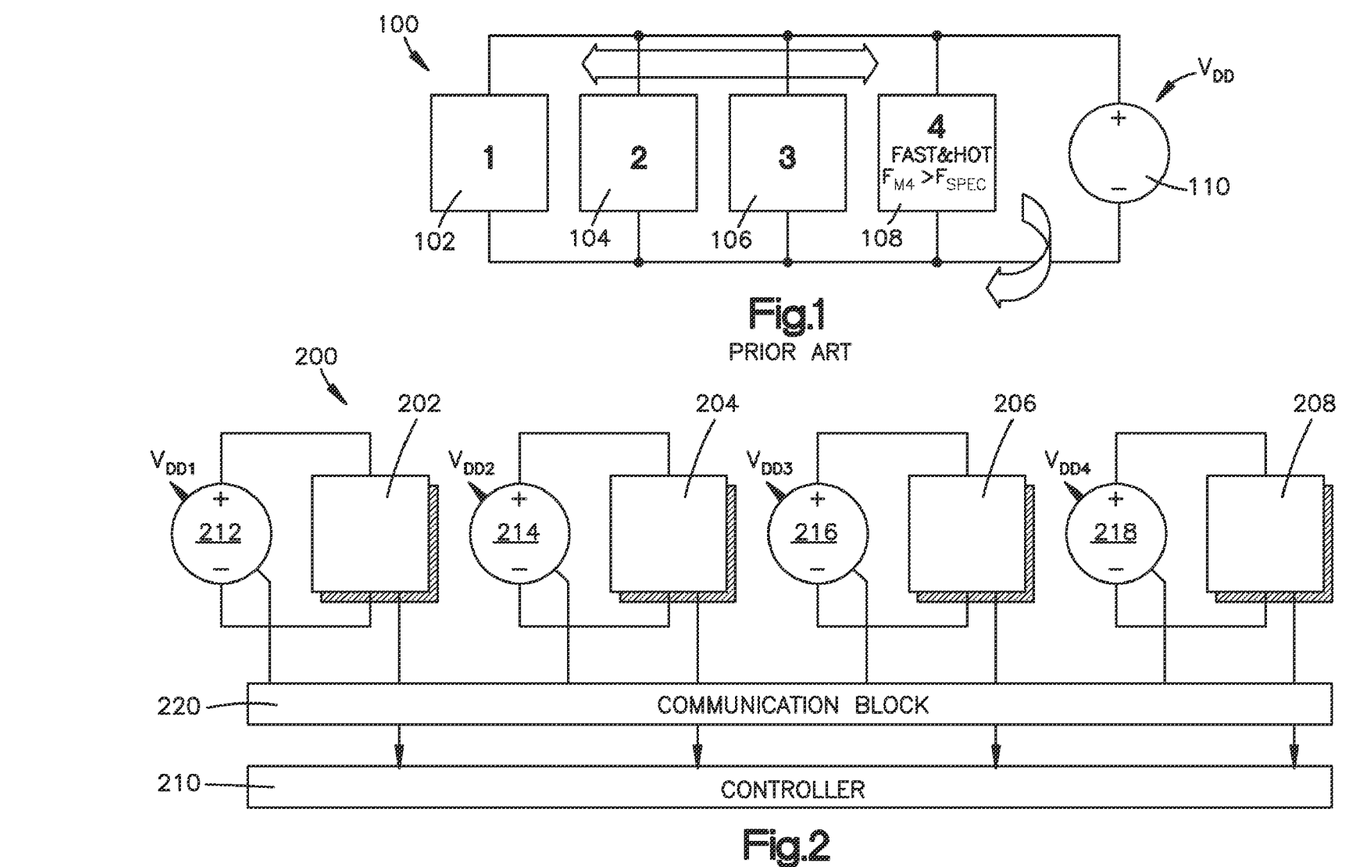
FIG. 1 is a schematic representation of a prior art multi-core processor structure.
FIG. 2 is a schematic representation of a multi-core processor structure according to the present invention.

FIG. 1 provides a schematic representation of a conventional prior art multi-core processor structure (MCP) 100 with four individual processing cores 102,104,106,108 each receiving a power supply voltage $V_{DD}$ from a power supply 110. Success or failure of the MCP 100 to meet performance standards is generally determined under prior art methods by observing both individual core and chip-wide behavior. Of first concern is the operational processing speed of each individual core 102,104,106,108, which may each be described by as a core clock rate ($f_{CLK, k}$), where k is an integer denoting one of the cores 102,104,106,108: each core k must demonstrate a minimum reference clock speed $f_{spec}$ for a specified nominal power supply voltage $V_{DDnom}$: if any one of the cores 102,104,106,108 fails to meet this requirement the entire MCP structure fails under prior art testing methodologies and systems, and no means are provided for correcting such a deficiency.

A second concern is the overall power consumption of the MCP chip 100. MCP's are generally required to perform within maximum power consumption requirements, and thus the MCP 100 power consumption $W_{CHIP}$, the sum of the power consumptions $P_k$ of each of the individual processor cores 102,104,106,108, must stay below a specified maximum $W_{Max}$ to meet performance specifications under prior art testing methodologies and systems, else the entire chip 100 fails. The power consumption $P_k$ of each of the individual processor cores 102,104,106,108 may be described by Equation 1:

$$P_k = (\alpha)(V_{DD}^2)(f_{CLK,k}); \qquad \text{Equation 1}$$

where $P_k$ is the power in Watts for a core k 102,104,106 or 108, $V_{DD}$ is the supply voltage in Volts from the power supply 110, $f_{CLK, k}$ is a core's processor core clock frequency in Hertz, and $\alpha$ is a semiconductor random variation parameter, for example a parasitic capacitance and resistance factor.

Although faster is generally better in terms of processor computing performance, as shown by Equation 1 a higher individual clock rate $f_{CLK, k}$ for a supply voltage $V_{DD}$ will result in a correspondingly higher core power consumption $P_k$. To ensure that total MCP 100 power consumption remains below a specified maximum power consumption ($W_{CHIP} < W_{MAX}$) it is generally required that each clock rate $f_{CLK,k}$ resulting from the common power supply voltage $V_{DD}$ is less than a specified maximum clock rate $f_{max}$: if any one of the cores 102,104,106,108 exhibits a clock rate $f_{CLK,k}$ higher than $f_{max}$, then the higher power consumption $P_k$ of that core indicates that total chip power consumption is be greater than a specified maximum ($W_{CHIP} > W_{MAX}$), and the entire chip MCP 100 structure fails, even though all of the remaining cores may have clock rates within specifications (for example, for the remaining core's k, $f_{CLK,k} < f_{max}$). And as the number of individual cores increases in MCP structures, the likelihood of within-chip core performance variation increases, and thus the likelihood that one individual core 102,104,106,108 will fail to meet specifications increases:

therefore, prior art MCP's yields may be expected to decrease as more individual cores are incorporated into single MCP chip structures.

Turning now to FIG. 2, a multi-core MCP structure 200 according to the present invention is provided comprising a plurality of individual processing cores 202,204,206,208, each connected to an adjustable power supply 212,214,216, 218, respectively, each of the power supplies 212,214,216, 218 controlled by a controller 210. It is known that each of the individual processing cores 202,204,206,208 may evidence divergent clock rates $f_{CLK, k}$ in response to similar operational inputs and operating environments. For example, in response to the same nominal power supply voltage $V_{DDnom}$ the first core 102 may exhibit an impermissibly slow clock rate relative to a minimum reference clock speed ($f_{CLK, k}$<$f_{spec}$), the second core 104 may exhibit an impermissibly fast clock rate relative to a maximum clock speed ($f_{CLK, k}$>$f_{max}$), and the other remaining cores 106,108 may operate within specifications ($f_{CLK, k}$>$f_{spec}$ and <$f_{max}$). What is important is that the present invention provides a means to adjust each individual core clock rate $f_{CLK, k}$ by adjusting its cores individual power supply voltage $V_{DD, k}$, thereby enabling the MCP chip 200 to pass specifications and increase yields.

In the present embodiment, the individual power supplies 212,214,216,218 are located off-chip, although on-chip embodiments of the present invention may also be practiced. It is also to be understood that the number of cores 212,214, 216,218 is chosen for illustrative purposes only, and that the MCP 200 may have more or less cores 212,214,216,218 according to the present invention.

An advantage of the present invention is that the controller 210 means is configured to individually select and adjust a supply voltage $V_{DD, k}$ supplied to each core 202,204,206,208 by its respective adjustable power supply 212,214,216,218, and thereby select a clock rate $f_{CLK, k}$ for each as required to meet one or more specifications. For example, if the core 202 clock rate $f_{CLK,k}$ fails to meet a minimum reference clock speed $f_{spec}$ then the controller may increase the supply voltage $V_{DD, k}$ supplied by its adjustable power supply 212 to thereby raise its clock rate $f_{CLK,k}$ equal to or greater than $f_{spec}$ and thereby bring the core 202 into specification. This may be performed on each of the remaining cores 204,206,208 as needed, and thus each core 202,204,206,208 may be configured to pass a minimum clock speed specification ($f_{spec}$), enabling an otherwise failing MCP 200 to pass said specification.

The MCP 200 further comprises at least one inter-core voltage-level translation communication block 220 configured to enable the cores 202,204,206,208 to function with divergent on-signal supply voltages $V_{DD, k}$. The communication block 220 may be located between the controller 210 and the cores 202,204,206,208. Alternatively, one or more communication blocks 220 may located among cores 202,204, 206,208 themselves, for example in the case of intra-core networks. Still further, the controller 210 may itself be configured to provide inter-core voltage-level translation functions and separate block structures 220 may be omitted.

Furthermore, as lowering a core clock rate lowers the power consumption $P_k$ for that core, the controller 210 is thus configured to lower overall chip power consumption $W_{CHIP}$ of the MCP 200 and enable an otherwise failing MCP 200 to pass said power consumption specification. For example, if the core 202 clock rate $F_{CLK,k}$ exceeds a maximum clock rate $f_{max}$ then the controller 210 may decrease the supply voltage $V_{DD, k}$ supplied by adjustable power supply 212 to thereby lower said clock rate $f_{CLK,k}$ and bring core 202 within specifications ($f_{CLK,k}$ less than or equal to $f_{max}$).

Figure 3:
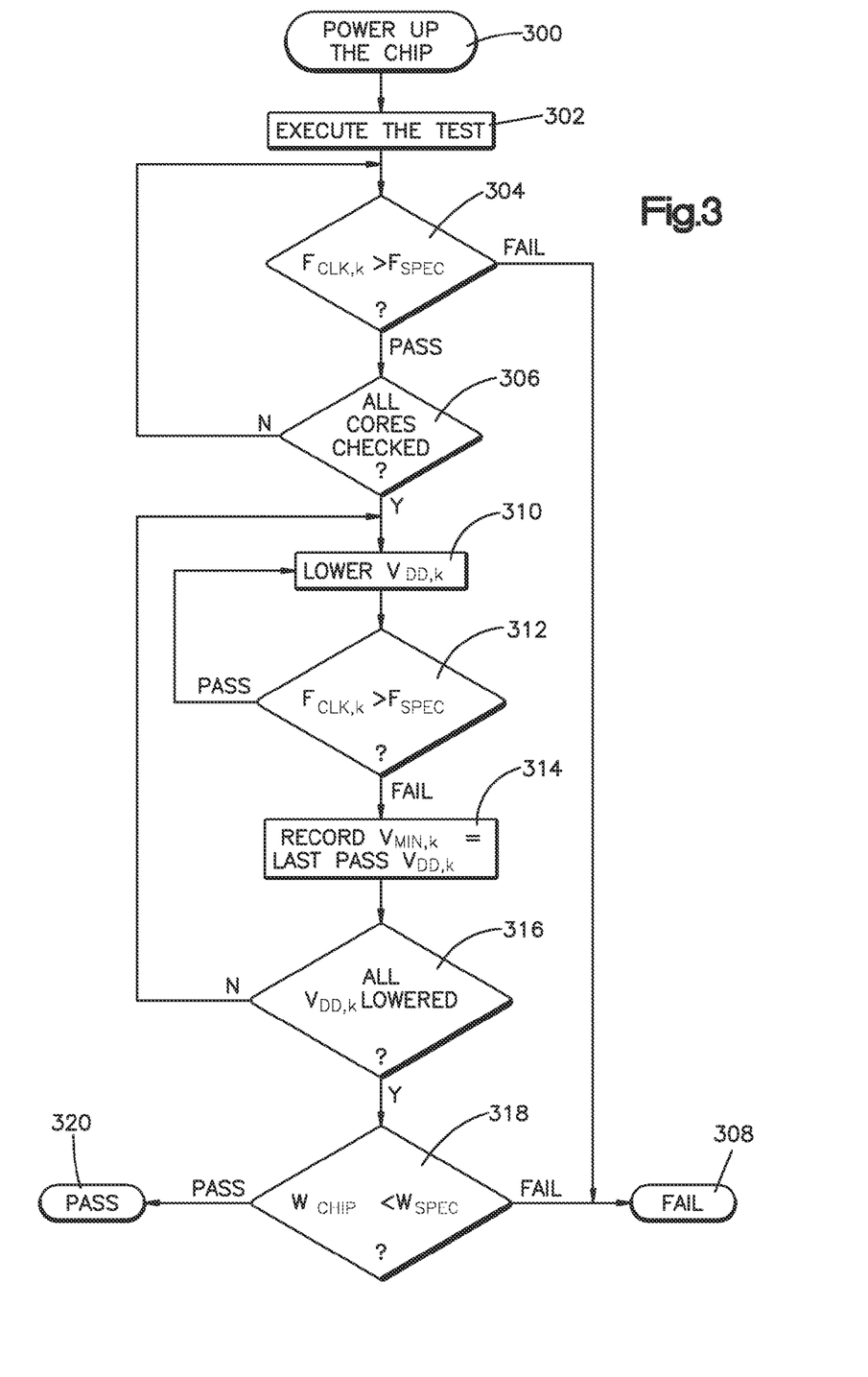
FIG. 3 illustrates a process for configuring a multi-core processor structure according to the present invention.

FIG. 3 illustrates a method for configuring the MCP 200 in response to performance specifications. At 300, the MCP 200 is powered up and at 302 a nominal supply voltage $V_{DDnom}$ is provided to each of the cores 202,204,206,208. $V_{DDnom}$ is generally selected as appropriate for the MCP 200 architecture through one or more circuit design rules, although in other embodiments it may be determined through other means. At 304 and 306, the clock rates $f_{CLK,k}$ of each of the cores 202,204,206,208 are checked to ensure that they meet a minimum reference clock speed $f_{spec}$ for the specified nominal power supply voltage $V_{nom}$. In the embodiment illustrated in FIG. 3, if any of the cores 202,204,206,208 fail ($f_{CLK, k}$<$f_{spec}$) than the MCP 200 fails and the process ends at 308.

Alternatively, if each core 202,204,206,208 meets the minimum reference clock speed $f_{spec}$ requirements then a first core k (202,204,206 or 208) is selected and the controller 210 causes its respective power supply 212 to supply a new lower supply voltage $V_{DD-0, k}$ at 310, thereby causing the first core k to operate at a new lower clock rate $f_{CLK-0, k}$ which is then compared to the minimum reference clock speed $f_{spec}$ at 312. If the new lowered core clock rate $f_{CLK-0, k}$ does not meet the specifications (for example, $f_{CLK, k}$ is less than or equal to the $f_{spec}$) at the new lower power supply voltage $V_{DD-0, k}$, then the previous original power supply voltage $V_{DDnom, k}$ is set as $V_{Min, k}$ for the core k at 314, and the process iterates through the remaining cores (202,204,206 or 208) as shown at 316.

However, if the new lowered core clock rate $f_{CLK-0, k}$ meets specifications (for example, $f_{CLK, k}$>$f_{spec}$) at 312 then the new lower power supply voltage $V_{DD-0, k}$ is itself lowered to a new stepped-down value $V_{DD-1, k}$ at 310 ($V_{DD-1, k}$<$V_{DD-0, k}$) and the clock responsively generated by the core ($f_{CLK-1, k}$) is then compared to the minimum reference clock speed $f_{spec}$ at 312. This process continues n times until an $n^{th}$ lowered clock rate lowered core clock rate $f_{CLK-n, k}$ does not meet the specifications (for example, $f_{CLK-n, k}$ is less than or equal to the $f_{spec}$), wherein the power supply voltage $V_{DD-(n-1), k}$ for the previous passing clock rate ($f_{CLK-(n-1), k}$) is set as the adjusted minimum nominal power supply voltage $V_{Min, k}$ for the core 202 at 314 by the controller 210.

The controller 210 thus sets adjusted minimum nominal power supply voltages $V_{Min, k}$ supplied by each respective power supply 212,214,216,218. With the $V_{DD, k}$ for each core 202,204,206,208 thus set to each respective $V_{Min, k}$, the overall chip power consumption $W_{CHIP}$ is determined with each core clocking at its $V_{Min, k}$ supply voltage, and $W_{CHIP}$ is compared to a specified maximum power consumption value $W_{MAX}$ at 318, the chip 200 responsively passed at 320 or failed at 308. Thus, if any of the cores 202,204,206,208 have their supply voltage lowered ($V_{Min,k}$<$V_{DDnom}$) the overall chip power consumption $W_{CHIP}$ is thereby lowered, and the likelihood of the chip 200 passing the power consumption specification ($W_{CHIP}$<$W_{MAX}$) is improved; the present invention thereby providing advantages in improving chip 200 manufacturing yields.

In another example, each $V_{Min, k}$ may be increased as required in response to one or more test codes. For example, referring now to FIG. 4, after each core $V_{Min,k}$ is set and the MCP chip passes overall chip power consumption requirements (for example, as illustrated in FIG. 3 and described above), at 402, one or more functional test code(s) is/are executed on each core 202,204,206,208 and corresponding core performances are observed. Each functional test code is selected wherein execution of the code approximates one or more core behaviors or environments, and wherein each core may then be assessed for performance at its $V_{Min, k}$: examples include core bottleneck behavior codes and design path worst-case delay codes, and other functional codes may be practiced according to the present invention, some of which will be apparent to one skilled in the art.

Figure 4:
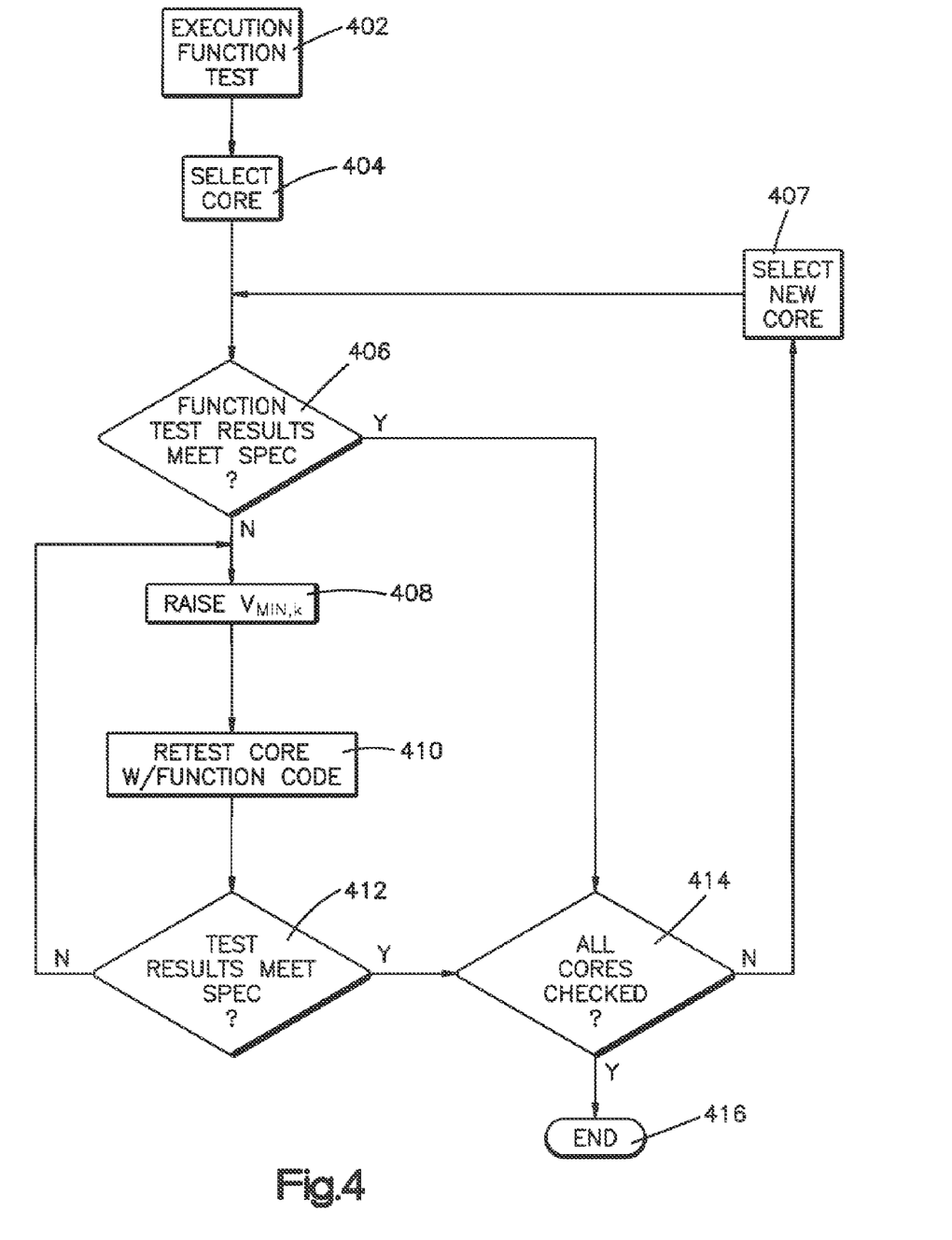
FIG. 4 illustrates another process for configuring a multi-core processor structure according to the present invention.

At 404, a first core 202 is selected and its function test code performance is compared to specification requirements at 406. If the test results meet the specifications, then the next core 204,206 or 208 is selected at 407 until all cores are tested (as shown at 414). If, however, the core 202 test results do not meet the required performance characteristic(s) at said $V_{Min, k}$ at 406, then at 408 the controller raises $V_{Min, k}$ for the core under test and the core k is retested with the functional code(s) at 410. In this fashion the controller may raise the $V_{Min, k}$ set for the core's power supply (212,214,216 or 218) one or more times until at 412 the core 202 meets required functional code(s) performance. At 414, this process is thus repeated for the remaining individual cores 204,206,208 until all cores 202,204,206,208 meet the performance requisites and the process ends at 416, thus with each $V_{Min,k}$ individually incremented as required.

Figure 5:
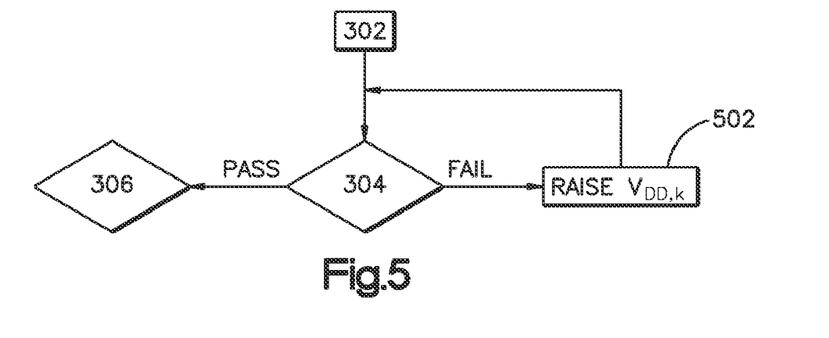
FIG. 5 illustrates another process for configuring a multi-core processor structure according to the present invention.

The present invention may also raise the clock rate of cores that do not meet a minimum reference clock speed, thereby enabling an otherwise failing MCP chip 200 to pass a minimum reference clock specification, which may further increase manufacturing yields. In one example illustrated in FIG. 5, the process of FIG. 3 incorporates an additional configuration process step 502 wherein each core k failing to meet the minimum reference clock speed at 304 has its supply voltage $V_{DD, k}$ raised until its clock rate $f_{CLK, k}$ meets the $f_{spec}$ requirement. Thus, the present invention may raise or lower each core supply voltage $V_{DD, k}$ as needed until each core meets specifications, thus enabling the MCP chip to pass both minimum and maximum core clock rate specifications in the present example.

The present invention provides for repetitive lowering iterations in order to enable graduated and/or incremental voltage lowering of each supply voltage $V_{DD, k}$ (for example, at steps 310 and 312 above) by the controller, which may gradually lower a core supply voltage $V_{DD, k}$ for each core 202,204,206,208 to determine the lowest supply voltage at which each individual core will evidence a clock rate required by specifications (for example, $V_{DD-(n-1), k}$). In one example, the $V_{DD, k}$ is lowered by the same fixed amount incrementally in a step-down fashion at each subsequent repeated lowering at 310. Alternative embodiments may lower the $V_{DD, k}$ in different and divergent amounts between repetitions: for example a second iteration lowering amount may be a logarithmic or algorithmic function of a previous first lowering amount. In some embodiments one or more of the supply voltages $V_{DD, k}$ may be selected through a search algorithm, for example through a binary search. Other means may also be used to determine the amount by which a power supply $V_{DD, k}$ is lowered at any iteration of step 310, and the present invention is not limited to the examples described herein.

Thus, the power supply 212,214,216 or 218 for any respective core 202,204,206 or 208 may be adjusted by the controller 210 to raise or lower the respective power supply voltage $V_{DD, k}$ provided. Rather than providing each core the same $V_{DD}$ value as taught in the prior art, by lowering at least one individual core's supply voltage $V_{DD,k}$ the present invention achieves a corresponding lowering of chip power consumption $W_{CHIP}$, which may enable the chip 200 to meet a maximum power consumption value $W_{MAX}$ that it otherwise would have been exceeded. And by raising at least one individual core's supply voltage $V_{DD,k}$ to comply with a minimum clock rate $f_{spec}$, the controller 210 enables an otherwise failing MCP chip 200 to pass another specification.

The faster a given core 202,204,206,208 is at $V_{Nom}$, the greater the amount of $V_{DD}$ reduction may be achieved in setting its $V_{Min}$, which corresponds to greater reductions in overall chip power consumption $W_{CHIP}$. Thus, faster cores 202,204,206,208 provide greater total $V_{DD}$ reductions, directly translating faster core efficiencies to lower overall chip 200 power consumption $W_{CHIP}$ values on an individual basis.

In another advantage, prior art individual core maximum clock rates $f_{max}$ specifications may be obviated. As long as each individual core 202,204,206,208 rate $f_{CLK, k}$ exceeds a designated minimum clock rate $f_{spec}$ at $V_{nom}$, and total chip power consumption $W_{CHIP}$ doesn't exceed a designated maximum $W_{MAX}$, then there may be no need to set a clock rate limit $f_{max}$ ceiling. Thus, further efficiencies are obtained by eliminating the possibility that the MCP chip 200 will fail an individual core maximum clock rate specification.

Figure 6:
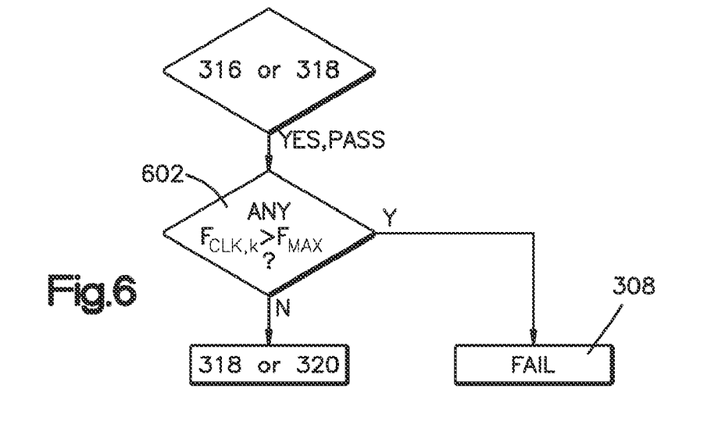
FIG. 6 illustrates another process for configuring a multi-core processor structure according to the present invention.

Alternatively, if individual cores are required to meet a maximum clock rate specification, then the present invention may provide a means for verifying that each core k meets said specification. Thus, in one example illustrated in FIG. 6, subsequent to determining each core's adjusted power supply voltage $V_{Min, k}$ at 316 or 318 as described above, the core clock rate $f_{CLK, k}$ at $V_{Min, k}$ is compared to a specified maximum rate $f_{max}$ at 602, wherein if any of the cores k fail to meet the maximum rate specification (for example, $f_{CLK, k} > f_{max}$), then the MCP chip fails at 308.

It will also be appreciated that in setting individual core voltage supply values $V_{Min,k}$ that one or more margin values may be used, for example to provide for margins or error or operational anomalies, as is well known in engineering conventions. Thus, in one or more embodiments of the chip 200 configuration processes discussed above (for example, at one or more of steps 310, 408 and 502), a core's supply voltage $V_{DD, k}$ is raised or lowered until the core's clock rate $f_{CLK,k}$ meets the required specification (312, 412 or 304, respectively) plus a margin value $f_{Margin}$. In this fashion MCP chip 200 functionality becomes more robust at the margin of $f_{spec}$ clock rates, though perhaps at the cost of providing lower power consumption efficiencies due to correspondingly higher $V_{Min}$ settings.

In alternative embodiments, margin voltage amounts may be provided. For example, when it is determined that a given supply voltage $V_{DD, k}$ produces a core clock rate $f_{CLK,k}$ meeting a relevant specification, then a margin voltage amount $V_{Margin}$ may be added or subtracted to the determined supply voltage $V_{DD, k}$ to define $V_{Min}$ (for example, at one or more of steps 314, 412 and 304). This provides advantages in some MCP processes and architectures wherein defining and/or providing for clock rate margin values, such as the $f_{Margin}$ configuration process described above, may be non-trivial. Thus, a $V_{Margin}$ may provide robust chip 200 functionality at the margins of varying operational or supply voltage environments.

The present invention may also be configured to limit an amount that $V_{DD}$ may be lowered by to determine each $V_{Min, k}$, for example to assure core functionality and/or desired performance characteristics. In one aspect, core 202,204,206, 208 digital circuitry may maintain functionality within an expected range of power supply voltages defined by manufacturing technology limits for the specific MCP 200 architecture. The present invention may accordingly be configured to ensure that total $V_{DD, k}$ reductions in establishing adjusted minimum nominal values $V_{Min, k}$ do not exceed allowable ranges for relevant technology limits. Thus, the present invention may limit $V_{Min,k}$ to a value or value range relative to a specific $V_{DD}$ value, for example in order to enable efficient handling of a core's input and output data, meet a required voltage swing amplitude and/or average level, or meet an error rate specifications. Other requirements may also be recognized by one skilled in the art and a $V_{Min,k}$ selected in response thereto, and the present examples are not exhaustive but are merely illustrative. Thus, in one example, at one or more of steps 314, 412 and 304 a minimum supply voltage threshold $V_{TH}$ is provided below which $V_{Min,k}$ may not be lowered or above which $V_{Min,k}$ may not be raised, and $V_{Min,k}$ is only decreased or increased until $V_{TH}$ is reached.

As described above, adjusted core power supply voltages may be determined by incrementally raising or lowering previous power supply values (for example, at one or more of 310, 408 or 502 above). In alternative embodiments, previous $V_{DD,k}$ values observed are saved at each testing iteration (for example, at one or more of 304, 314, or 412 above), and these saved values are selected and a core k retested through one or more subsequent iterations (for example, at one or more of 310, 408 or 502 above) until the lowest or highest previously saved $V_{DD,k}$ value passing the respective test is selected as the new $V_{Min,k}$ for the core k (for example, at one or more of 304, 314, or 412 above).

II. Computerized Implementation

Figure 7:
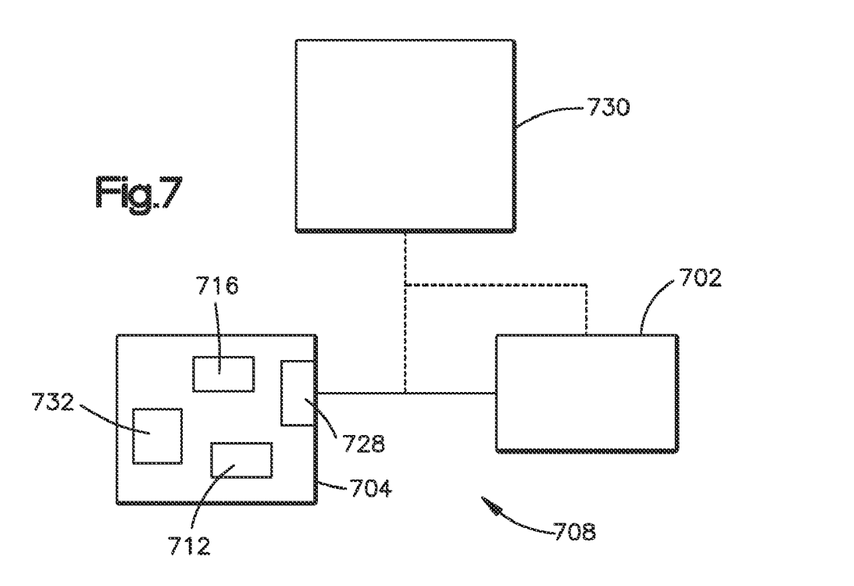
FIG. 7 is a schematic representation of a computing structure appropriate for practicing the present invention.

Referring now to FIG. 7, a diagram of a computerized implementation 708 of the present invention is shown. As depicted, implementation 708 includes a multi-core processor chip 712 deployed within a computer system 704 which demonstrates, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 708 is intended to demonstrate that some or all of the components of implementation 708 could be deployed, managed, serviced, etc. by a service provider who offers to implement, deploy, and/or perform the functions of the present invention for others.

As shown, computer system 704 includes the MCP 712, a memory 732, a storage system 716 and an input/output (I/O) interface 728. Further, the computer system 704 is shown in communication with external device 702 computer systems and an external computer or computer network 730. In general, the MCP 712 executes computer program code, which may be stored in the memory 732 and/or the storage system 716. While executing computer program code, the MCP 712 can read and/or write data to/from memory 732, storage system 716, and/or I/O interface 728. External device 702 can comprise any device (e.g., keyboard, pointing device, display, etc.) that enables a user to interact with computer system 704 and/or any devices (e.g., network card, modem, etc.) that enable the computer system 704 to communicate with one or more other computing devices 730.

The computer infrastructure 708 is only illustrative of various types of computer infrastructures for implementing the invention. For example, in one embodiment, computer infrastructure 708 comprises two or more computing devices 704, 730 (e.g., a server cluster) that communicate over a network to perform the various process steps of the invention. Moreover, computer system 708 is only representative of various possible computer systems that can include numerous combinations of hardware. To this extent, in other embodiments, the computer system 708 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, memory 732 and/or storage system 716 can comprise any combination of various types of data storage and/or transmission media that reside at one or more physical locations. Further, I/O interface 728 can comprise any system for exchanging information with one or more external device 702. Still further, it is understood that one or more additional components (e.g., system software, math co-processing unit, etc.) not shown in FIG. 7 can be included in computer system 704. However, if computer system 704 comprises a handheld device or the like, it is understood that one or more external devices 702 (e.g., a display) and/or storage system 716 could be contained within computer system 704, not externally as shown in part.

Storage system 716 can be any type of system (e.g., a database) capable of providing storage for information under the present invention. To this extent, storage system 716 could include one or more storage devices, such as a magnetic disk drive or an optical disk drive. In another embodiment, storage system 716 includes data distributed across, for example, a local area network (LAN), wide area network (WAN) or a storage area network (SAN) (not shown). In addition, although not shown, additional components, such as cache memory, communication systems, system software, etc., may be incorporated into computer system 704.

Thus, the computer system memory 732, or similar structures within the external device 702 or the external computer or computer network 730 may comprise an MCP configuration application, said application configured to perform one or more of the processes of the present invention as discussed above. Specifically, MCP configuration software may comprise computer executable program code, said code comprising instructions which, when executed on the computer system 704 and/or 730, causes the computer system 704,730 to selectively adjust multi-core processor chip structure 712 individual processor core power supply voltages to ensure that one or more cores operate at clock rates in compliance with one or more performance specifications.

While shown and described herein as a method and system for providing individual power supply voltages to each core of a multi-core processor structure, it is understood that the invention further provides various alternative embodiments. For example, in one embodiment, the invention provides a computer-readable/useable medium that includes computer program code to enable a computer infrastructure to practice the steps of the present invention as discussed above. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 732 and/or storage system 716 (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to selectively adjust multi-core processor chip structure 712 individual processor core power supply voltages to ensure that one or more cores operate at clock rates in compliance with one or more performance specifications. In this case, the service provider can create, maintain, support, etc., a computer infrastructure, such as all or part of the computer infrastructure 708, which performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for selectively adjusting multi-core processor chip structure 712 individual processor core power supply voltages to ensure that one or more cores operate at clock rates in compliance with one or more performance specifications. In this case, a computer infrastructure, such as a computer infrastructure 708, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 704, from a computer-readable medium (for example, a storage unit 716); (2) adding one or more computing devices 730 to the computer infrastructure; and (3) incorporating and/or modifying one or more existing systems 704,730 of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for supplying power to first and second processing cores formed on a multi-core processor system chip, comprising the steps of:
supplying a nominal power supply voltage to a first processing core;
supplying a second core power supply voltage to a second processing core, the second core power supply voltage greater or lower than the nominal power supply voltage;
the first core operating at a rate in compliance with a reference clock rate specification; and
the second core operating at the rate in compliance with the reference clock rate specification.

2. The method of claim 1, further comprising selecting the second core power supply voltage by raising or lowering the nominal power supply voltage until the second core operates at the rate in compliance with the reference clock rate specification.

3. The method of claim 2, wherein the step of selecting the second core power supply voltage comprises lowering the nominal power supply voltage by:
progressively lowering the nominal supply voltage to define a plurality of progressively ordered discrete supply voltages; and
determining the second core supply voltage by selecting a lowest supply voltage of the plurality of ordered discrete supply voltages at which the second core operates at the rate in compliance with the reference clock rate specification.

4. The method of claim 3, wherein the reference clock rate specification is a sum of a specified minimum reference clock rate and a margin rate.

5. The method of claim 3 wherein the step of determining the second core supply voltage further comprises adding a margin voltage to the selected lowest supply voltage.

6. The method of claim 3 wherein the step of determining the second core supply voltage further comprises selecting the lowest supply voltage of the plurality of ordered discrete supply voltages that is also greater than a specified functional threshold voltage.

7. The method of claim 3, further comprising the step of the second core processing a functional test code;
wherein the step of determining the second core supply voltage further comprises selecting a lowest supply voltage of the plurality of ordered discrete supply voltages that also enables the second core to operate within a performance specification when processing the functional test code.

8. The method of claim 7, wherein the functional test code is a core bottleneck behavior code or a worst-case delay code.

9. The method of claim 7, wherein the step of selecting the lowest supply voltage comprises:
progressively testing the second core with the functional test code with each of the plurality of progressively ordered discrete supply voltages in an order from a lowest voltage to a highest voltage until a one of the discrete supply voltages is identified at which the second core operates at a rate greater than the a reference clock rate and within the performance specification.

10. The method of claim 3, further comprising the steps of:
supplying a third core power supply voltage to a third processing core;
selecting the third core power supply voltage by raising the nominal power supply voltage until the third core operates at the rate in compliance with the reference clock rate specification.

11. An apparatus, comprising:
a controller in circuit communication with a first adjustable power supply and a second adjustable power supply that causes the first adjustable power supply to supply a nominal power supply voltage to a first individual processing core formed on a unitary chip structure to cause the first core to operate at a rate within a reference clock rate specification, and to cause the second adjustable power supply to supply a second power supply voltage that is more or less than the nominal voltage to a second individual processing core formed on the unitary chip structure to cause the second core to operate at the rate within the reference clock rate specification.

12. The apparatus of claim 11, wherein the controller further selects the second power supply voltage by raising or lowering the nominal power supply voltage until the second core operates at the rate within the reference clock rate specification.

13. The apparatus of claim 12, wherein the first and second individual processing cores are formed in a common process.

14. The apparatus of claim 12, further comprising:
at least one inter-core voltage-level translation communication block in communication with the first and second cores to enable said first and second cores to function with divergent on-signal supply voltages.

15. The apparatus of claim 12 wherein the controller selects the second power supply voltage by lowering the nominal power supply voltage, and determines the second core supply voltage by selecting a lowest supply voltage of a plurality of ordered discrete supply voltages that are also each greater than a specified functional threshold voltage.

16. The apparatus of claim 15,
wherein the controller further causes a third adjustable power supply connected to a third individual processing core formed on the unitary chip structure to supply a third power supply voltage to the third core, the third power supply voltage more than the nominal voltage, the third power supply voltage selected to cause the third core to operate at the rate within the reference clock rate specification.

17. The apparatus of claim 15, wherein the controller further determines the second core supply voltage by selecting a lowest supply voltage of a plurality of ordered discrete supply voltages that also enables the second core to operate within a performance specification when processing a functional test code.

18. The apparatus of claim 17, wherein the functional test code is a core bottleneck behavior code or a worst-case delay code.

19. An article of manufacture for supplying power to first and second processing cores formed on a multi-core processor system chip, comprising:
a computer readable storage medium having computer readable program code embodied therewith, the computer readable program code comprising:
computer readable program code configured to supply power to first and second processing cores formed on a multi-core processor system chip by:
supplying a nominal power supply voltage to a first processing core; and
supplying a second core power supply voltage to a second processing core, the second core power supply voltage greater or lower than the nominal power supply voltage;
wherein the first core operates at a rate in compliance with a reference clock rate specification; and
wherein the second core operates at the rate in compliance with the reference clock rate specification.

20. The article of claim 19 wherein the program code is further to select the second core power supply voltage by raising or lowering the nominal power supply voltage until the second core meets the reference clock rate specification;
wherein the lowering the nominal power supply voltage comprises progressively lowering the nominal supply voltage to define a plurality of progressively ordered discrete supply voltages; and
wherein determining the second core supply voltage comprises selecting a lowest supply voltage of the plurality of ordered discrete supply voltages at which the second core operates at the rate in compliance with the reference clock rate specification.

* * * * *